July 22, 1924.

J. L. CARBERY

STEAM COOKING APPARATUS

Filed Jan. 2, 1918

Witness:
Jas. E. Hutchinson

Inventor:
Jas. L. Carbery,
By Jos. H. Milans
Attorneys

July 22, 1924.
J. L. CARBERY
1,502,172
STEAM COOKING APPARATUS
Filed Jan. 2, 1918   3 Sheets-Sheet 2
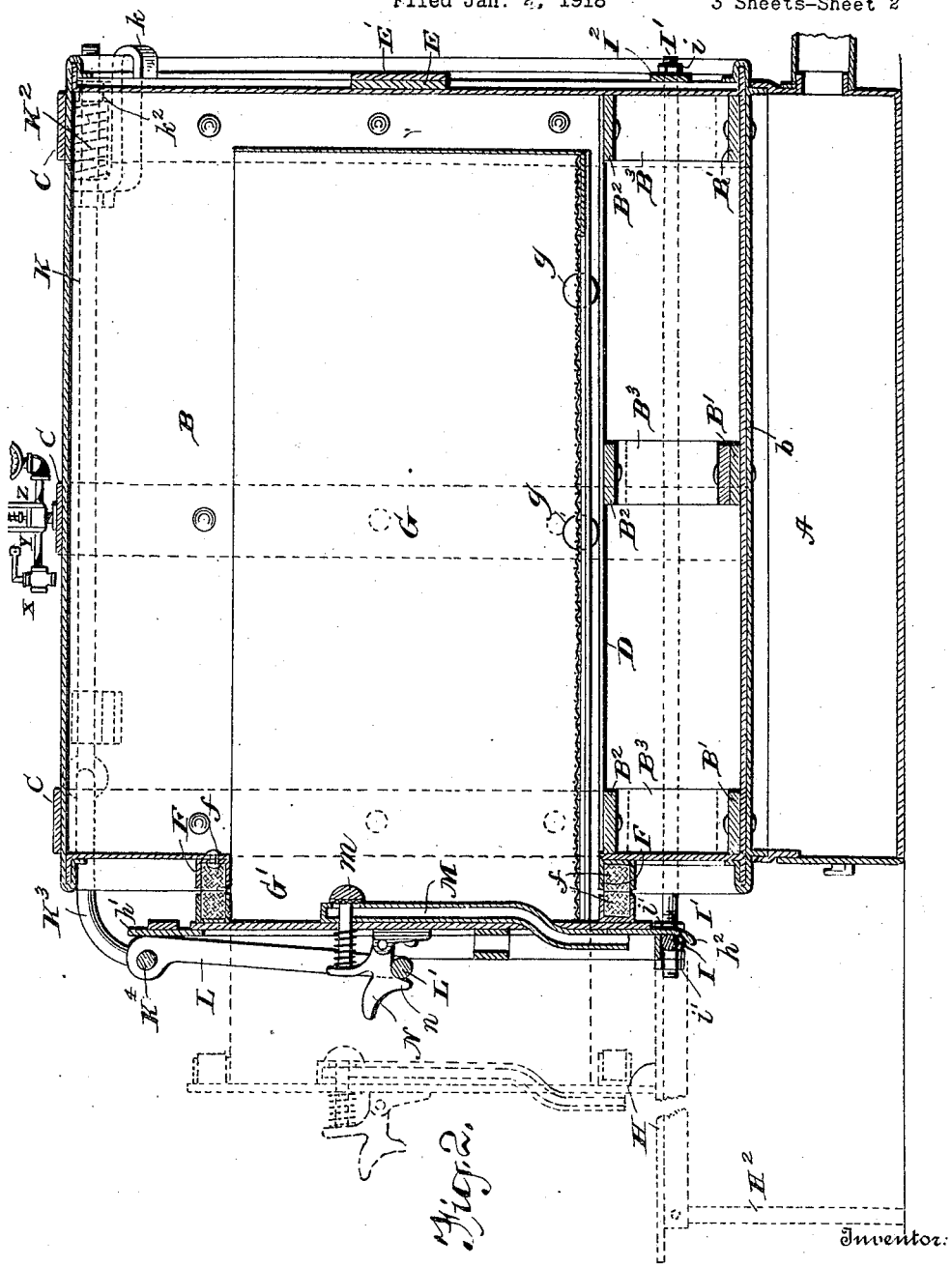

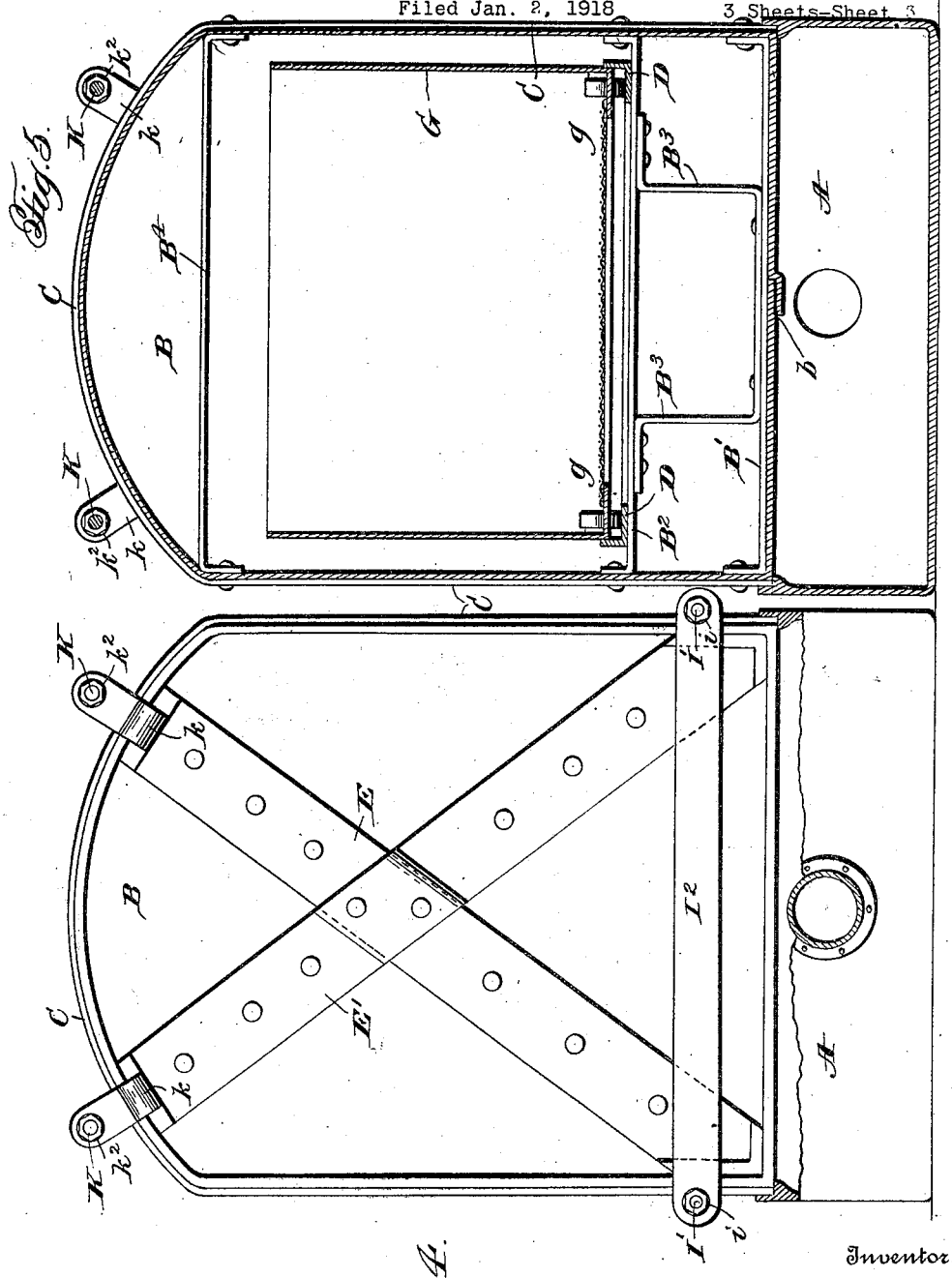

Patented July 22, 1924.

1,502,172

UNITED STATES PATENT OFFICE.

JAMES L. CARBERY, OF ROCK HILL, SOUTH CAROLINA.

STEAM COOKING APPARATUS.

Application filed January 2, 1918. Serial No. 209,922.

*To all whom it may concern:*

Be it known that I, JAMES L. CARBERY, a citizen of the United States, residing at Rock Hill, in the county of York and State of South Carolina, have invented certain new and useful Improvements in Steam Cooking Apparatus, of which the following is a specification, reference being had therein to the accompanying drawing.

This invention relates to an improvement in steam cooking apparatus especially such apparatus as disclosed in Patent No. 1108967 issued to me on September 1, 1914.

The general purpose of the invention is that of providing a portable steam cooking apparatus which can be used either by placing on the average kitchen range or in connection with an independent fire box.

In such cookers the cans of material to be cooked processed and sterilized are placed within the cooking zone above a body of water heat being applied to the bottom of the water tank generates steam which is the medium for cooking, sterilizing, etc., the material being treated.

It has been found in practice that a steam pressure of approximately five pounds is advantageous although in many cases a higher pressure may be had.

One of the essential attributes of an apparatus of this type is that it should be properly constructed to resist a steam pressure which would tend to disrupt the walls and to cause an explosion so called.

Another requirement in such apparatus is that of maintenance of proper seal joints to conserve the steam generated within the apparatus.

The present invention contemplates a strong, rigid structure relatively light so that the average domestic can place the same on the stove or range and which will be so braced and strengthened as to prevent the sides or ends from bulging or breaking; which will have adequate means for maintaining a proper seal at the door; a cooker which will be equipped with means for permitting a preliminary escape of steam just prior to the opening of the apparatus and one wherein the door proper will yield to over-internal pressure permitting the escape of steam and automatically reseal upon the reduction of internal pressure.

Various details of construction are shown in the attached drawings but it is to be understood that the form and shape of the apparatus may be varied and that modifications can be made without departing from the general nature and principle of the invention.

In the drawings:—

Figure 2 is a longitudinal section showing parts in elevation.

Figure 4 is a rear view, and

Figure 5 is a transverse section.

Figure 1:
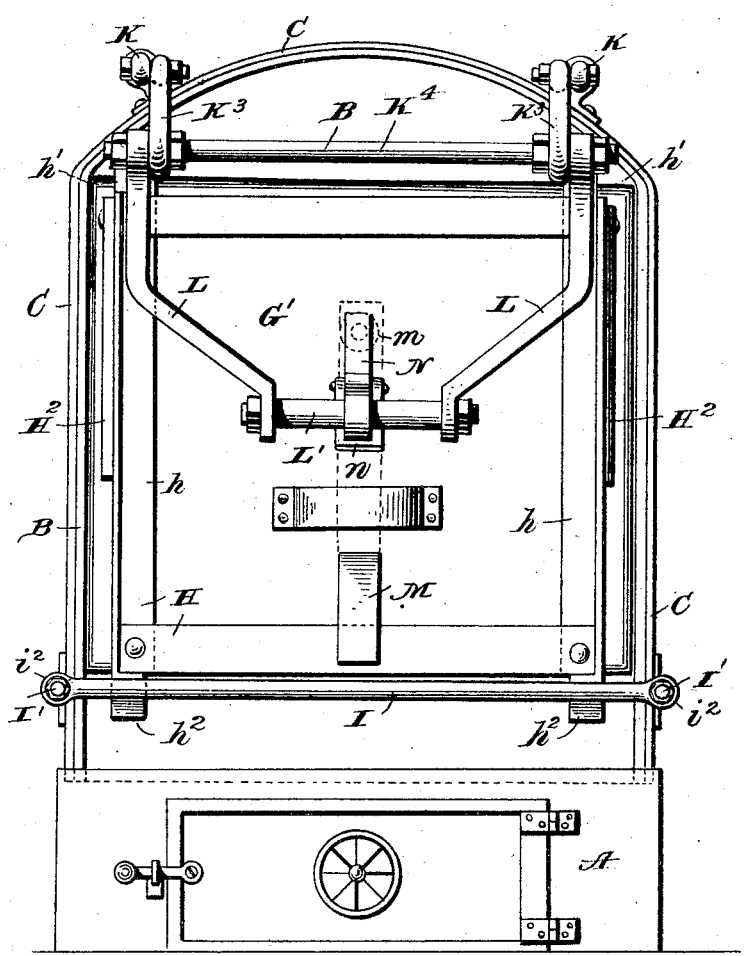
Figure 1 is a front elevation of a cooker.

A designates a detachable fire-box provided with a suitable outlet flue and door. The upper edge of the fire-box is conveniently formed to constitute a seat for the cooking chamber. B designates a casing of a length and width to receive a carrier for the cans presently to be described, it being understood that these cookers are designed to receive in the neighborhood of thirty or more glass fruit jars of the usual type. The walls of the casing are formed of sheet iron conveniently and are braced throughout by tie bands C the latter being properly riveted at different points to the casing and terminating at the lower edge. The casing is conveniently dome shaped and the lower parts of the metal sides are carried inward the edges being lapped as shown at $b$ and a suitable fusible solder being interposed if desired. To strengthen the lower part of the casing, that is to say, that portion wherein the water is placed, suitable U-bars B' are extended across the bottom their up-turned ends being riveted to the lower ends of the sides and the tie bands while the bottom part is riveted or secured to the braces at such points as may be desired. These braces are spaced apart conveniently one at each end and one in the center but the number may be varied according to requirements.

Above the lower braces B' is a complementary brace $B^2$ of a similar construction spanning the chamber within the casing and having its up-turned ends properly riveted to the tie bands. To form a properly trussed structure at the bottom it has been found convenient to interpose a U-shaped intermediate brace $B^3$ connecting the two braces as shown in Figure 5. The upper brace $B^2$ performs the dual function of adding the necessary rigidity to the lower part of the cooker and also serves as a support for the tracks D which are positioned thereon and secured thereto. These tracks are by preference extended the length of the interior of the cooker as in my aforesaid patent. The interposed braces B³ serve to assist the braces B² in supporting the drawer or carrier when loaded.

Spanning the upper part of the casing immediately below the dome are cross braces B⁴ having their down-turned ends riveted to the sides and through the reinforcing bands C. These braces are spaced at different points and the entire structure thus represents a very rigid, non-collapsible or non-bulging casing. It has been found desirable to reinforce the back of the casing and this is done in a manner as shown in Figure 4. Suitable bars E, E' are disposed diagonally across the back and riveted thereto, the same extending from corner to corner one crossing the other at the center. The ends of these bars terminate at the edges and are conveniently interlocked with the lapped seam formed between the side edges of the casing and the back, any convenient form of union may however be employed at this point. The front of the casing is provided with an opening margined by a U-shaped metallic frame F containing therein a flexible packing f.

Figure 3:
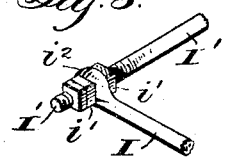
Figure 3 is a detail view of the adjustable connection for the supporting bar.

G designates the carriage, car or drawer. This may be formed with metallic sides, an open top and a screen or slatted bottom as desired. The drawer is provided with supporting casters g fitting the tracks D which latter have their track surfaces on the plane of the lower part of the door opening. The front G' of the drawer is fashioned to project laterally beyond the door opening at all points and is provided with a frame of U-section arranged in alignment with the frame F and containing a packing held in complemental position with the packing of the frame F. The extreme outer margin of the door or front of the drawer extends laterally beyond the packing carried thereby for purposes presently to be described. In structures of this type it is desirable to forcibly maintain a compressed state between the packing elements so that a steam tight joint is formed around the door-way. It is also desirable in an apparatus of this kind to provide a means for permitting the door to open in the case of abnormal pressure existing within the inside of the cooker. With this end in view I provide a combined support and door closing frame H. This is an open work construction and the side bars h thereof are positioned when in service directly in front of the packing carrying channel of the closure. The end bars are likewise positioned but the side bars at opposite ends are extended beyond the end bars as at h' and h² the latter being slightly bent to constitute hook members. The hook members h² are designed to take over and back of a cross bar I adjustably connected by the means as shown in Figure 3 to the longitudinal bars I'. These bars I' extend to the back of the machine there being one on each side, their rear ends passing through a cross bar I² for anchorage purposes, suitable nuts i being employed at the ends. The front ends of the bars I' are threaded and are provided with any convenient means of adjustment preferably two nuts i' while the pivot bar I is provided with eyes i² fitting between the nuts on the ends of bars I'. By this means the pivot bar may be adjusted backwards or forwards to vary the leverage or fulcrum of the closing and locking frame H when the locking frame is swung upward against the closure. The frame H is pressed forcibly against the packing parts of the closure and for this purpose a suitable locking mechanism is provided. A locking mechanism ascertained to be satisfactory is one wherein conveniently two longitudinal rods such as K are employed the rear ends of which, as shown in Figure 2, are threaded and provided with loosely fitting hook members k. These hook members are designed to take over the beaded edge at the rear and have offset portions sleeved over the rods K. Interposed between the offset portions of the hooks and the nuts k² on the threaded ends of the bars K are springs K². The forward ends of the rods K are provided with links K³ pivotally connected thereto which links at their forward ends are curved downward and receive a connecting cross bars K⁴ passing through eyes in the lower ends of the parts K³.

Mounted on the bar K⁴ are the lever arms L having cam portions at their upper ends positioned to engage the extended ends h' of the side bars of the locking frame. These levers L are inturned at their lower edge and are united by a hand portion L' as shown in Figure 1. By lowering the levers positive pressure is brought against the entire locking frame throughout, the exactness of which is secured by the adjusting of the bar I. The pressure exerted upon the locking frame is a yielding pressure, as the springs K² permit the bars K to move slightly.

Should the internal steam pressure be excessive the rods K yield and move forward thus allowing the locking frame to tilt slightly the closure to be moved outward and the steam to escape between the joints at the margin of the opening. This is an important advantage in the construction. It is often found necessary to vent the interior just prior to opening the casing for the withdrawal of the contents. This is desirable as it prevents sudden outrush of steam. With a view of providing means for this preliminary venting I provide a vent tube M at the front of and inside the drawer carrying the lower end out through the drawer to a point adjacent the bottom edge thereof as shown clearly in Figure 2. $m$ designates the valve for closing the vent opening in the tube M at the top. This valve is spring pressed to a closed position and its stem extends through the closure at which point it engages the end of a trigger N normally setting the catch or retaining end $n$ thereof in a position to embrace and hold the handle L against movement. Should the operator desire to open the cooker it is necessary in the first instance to vent the same by raising the part N compressing the spring on the stem of the valve $m$ thus permitting the handle L' to be moved from under the catch or trigger outward, the levers L with a connecting part $K^3$ are then thrown back and the locking frame tipped down as shown in dotted lines. In this position suitable foldable legs $H^2$, provided on the locking frame, support the outer end thereof so that the frame when lowered forms a platform with which the lower projecting edge of the closure engages and serves to support the drawer and its contents when drawn outward as indicated in dotted lines in Figure 2.

Of course the general shape of the cooker may be varied from the dome to a rectangular or circular form as may be found necessary but it is thought that the depicted shape is more convenient for general purposes.

The operation of the apparatus is substantially as follows, the jars are placed in the carriage or drawer G which is then rolled into the cooker until the packings engage, the locking frame is then raised and the levers lowered into locking position, fire being built in the fire-box or in the stove, water is placed in the lower part of the heater and the steam generated will properly treat the contents of the jars which are usually left with the tops open. The working of the various parts has heretofore been described. A suitable gage safety valve for operation under normal conditions and a manually operated blow off are indicated at X, Y, Z respectively. Other means may be employed for preliminary venting purposes if desired.

Having thus described the invention what is claimed and desired to secure by Letters Patent is:—

1. A steam cooker comprising a sheet metal casing, reinforcing bands extending across the top and sides of the casing at the exterior thereof, and brace members located interiorly of the casing and connected at opposite ends with said reinforcing bands and opposite sides of the casing.

2. A steam cooker comprising a sheet metal casing, reinforcing bands extending across the top and sides of the casing at the exterior thereof, and transverse brace members located interiorly of the casing at the lower part thereof and connected at opposite ends with said reinforcing bands and opposite sides of the casing.

3. A steam cooker comprising a sheet metal casing, pairs of transverse brace members connected at opposite ends with opposite sides of the casing and arranged in spaced relation one above the other at the interior of the casing, and intermediate substantially U-shaped brace members connecting each pair of said transverse brace members together.

4. In a steam cooker, a casing, a closure member for the casing, and locking means for the closure adapted to yield under abnormal pressure within the casing, said locking means including rods extending longitudinally of the casing and supported for sliding movement thereupon, a spring associated with each rod at one end thereof, link members pivotally connected with the rods, and cams carried by the link members to engage the closure.

5. In a steam cooker, the combination of a casing, a closure member for the casing, an independent locking frame for the closure, means for pivotally and adjustably supporting said locking frame at one end, and yieldable locking means connected with the casing and engaging the opposite end of the independent locking frame.

6. In a steam cooker, the combination of a casing, a closure member for the casing, an independent locking frame for the closure, means for pivotally and adjustably supporting the locking frame at one end, and locking means comprising a cam lever yieldably connected with the casing and engaging the opposite end of the independent locking frame.

7. In a steam cooker, the combination of a casing, a package carrier slidable into and out of the casing, a closure for the casing at one end of the package carrier, an independent locking frame to fit against the outer face of the closure, means for locking the frame against the closure, and means for supporting the locking frame in a horizontal position, said closure having a part at the front thereof adapted to rest when the package carrier is out of its normal position in the casing upon the locking frame when the latter is in its horizontal position.

8. In a steam cooker, the combination of a casing, a closure for the casing, locking means for the casing including a bail connected with the casing, of a trigger mounted upon the closure and adapted to engage over the bail, and a vent valve on the closure comprising a spring pressed stem engaging a portion of the trigger and acting to maintain the same in engagement with the bail and the valve in closed position, the movement of the trigger to release the bail operating to force the valve stem inwardly to open the valve.

9. In a steam cooker, the combination with a closure, of an independent locking frame for fitting against the closure, means whereby the locking frame may be adjusted relatively to the closure, spring pressed means for locking the frame in position for retaining the closure in closed position under normal internal pressure, retaining means carried by the closure for retaining the locking means in locked position, and venting means operable by the retaining means when the locking means is to be released.

10. In a steam-cooker, a casing, a package-carrier movable into and out of the casing and having a wall forming a closure for the casing, complementary packing units carried by the closure and casing, a locking frame for fitting against the outer face of the closure over the packing units, means whereby the locking frame at one side may be adjustably connected with the casing and held against the closure when the frame is locked, co-operating locking means between the casing and the opposite side of the frame for resiliently locking the frame against the closure, retaining means for retaining the locking means in locking position, and venting means operable by the retaining means when the locking means is to be released.

11. In a steam-cooker, a casing, a package-carrier movable into and out of the casing and having a wall forming a closure for the casing, a locking frame fitting against the outer face of the closure, means whereby the locking frame at one side may be adjustably and pivotally connected with the casing and held against the closure when the frame is locked, co-operating locking means between the casing and the opposite side of the frame for resiliently locking the frame against the closure, retaining means for retaining the locking means in locked position, and venting means operable by the retaining means when the locking means is to be released.

12. In a steam-cooker, a casing, a package-carrier movable into and out of the casing and having a wall forming a closure for the casing, a locking frame fitting against the closure adjacent the edges thereof, means for pivotally mounting the locking frame relatively to the closure, and for adjustably retaining the frame at one side against the closure when the frame is locked, and co-operating locking means between the casing and the opposite side of the frame for resiliently locking the frame against the closure.

13. In a steam-cooker, a casing, a locking frame, means pivotally connecting the locking frame adjacent one edge with the casing, and adjustably supporting the locking frame relatively to the casing, a closure for the casing against which the locking frame may fit, and co-operating locking means between the opposite edge of the frame and the casing for resiliently locking the frame against the closure.

14. In a steam-cooker, a casing, a locking frame, means pivotally connecting the locking frame adjacent one edge with the casing, and adjustably supporting the locking frame relatively to the casing, a closure for the casing against which the locking frame may fit, and co-operating locking means between the opposite edge of the frame and the casing for resiliently locking the frame against the closure, retaining means for retaining the locking frame in locked position, and venting means operable by the retaining means when the locking means is to be released.

In testimony whereof I hereunto affix my signature in the presence of two witnesses.

JAMES L. CARBERY.

Witnesses:
ARTHUR CUNNINGHAM,
J. B. PAYSIRGLE.